US006981517B2

(12) United States Patent
Snijders

(10) Patent No.: US 6,981,517 B2
(45) Date of Patent: Jan. 3, 2006

(54) GAS SUPPLY SYSTEM, VALVE ASSEMBLY AND METHOD OF FORMING REACTANT PULSES BY OPERATING A VALVE ASSEMBLY

(75) Inventor: Gert-Jan Snijders, Amersfoort (NL)

(73) Assignee: ASM International N.V., Bilthoven (NL)

( * ) Notice: Subject to any disclaimer, the term of this patent is extended or adjusted under 35 U.S.C. 154(b) by 36 days.

(21) Appl. No.: 10/864,260

(22) Filed: Jun. 9, 2004

(65) Prior Publication Data

US 2004/0250853 A1 Dec. 16, 2004

(30) Foreign Application Priority Data

Jun. 11, 2003 (EP) ............................. 03076812

(51) Int. Cl.
*F16K 7/00* (2006.01)
*F16K 11/00* (2006.01)

(52) U.S. Cl. .................. 137/597; 137/628.25

(58) Field of Classification Search ................. 137/597, 137/625.48–625.5, 625.64–625.69, 625.25–625.27, 137/625.2

See application file for complete search history.

(56) References Cited

U.S. PATENT DOCUMENTS

| | | | | |
|---|---|---|---|---|
| 3,739,811 | A | * | 6/1973 | Gross ..................... 137/625.27 |
| 5,048,563 | A | * | 9/1991 | Buchanan et al. .......... 137/597 |
| 5,131,627 | A | | 7/1992 | Kolenc |
| 5,520,001 | A | | 5/1996 | Miyamoto et al. |
| 5,542,452 | A | | 8/1996 | Carver, Jr. et al. |
| 5,922,286 | A | | 7/1999 | Girard et al. |
| 6,250,332 | B1 | * | 6/2001 | Backlund .................... 137/597 |
| 6,615,871 | B2 | * | 9/2003 | Ohmi et al. ................ 137/884 |
| 6,644,348 | B2 | * | 11/2003 | Possanza et al. ........... 137/597 |

* cited by examiner

*Primary Examiner*—Paul J. Hirsch
(74) *Attorney, Agent, or Firm*—Weingarten, Schurgin, Gagnebin & Lebovici LLP

(57) ABSTRACT

A gas supply system for pulse-wise feeding a reactant gas to a reactor, the gas supply system comprising:
  a first valve being a four-port diaphragm valve;
  a second valve which in an open state brings the first port into fluid communication with an exhaust and in a closed state closes off said fluid communication;
wherein the gas supply system provides a reactant flow state in which the first valve is in an open state and the second valve is in a closed state, and wherein the gas supply system provides a purge state in which the first valve is closed and the second valve is in a open state. Also disclosed are a method of switching a process fluid by operating a gas supply system according to the invention and a valve assembly for use in such a gas supply system.

29 Claims, 11 Drawing Sheets

GAS SUPPLY SYSTEM, VALVE ASSEMBLY AND METHOD OF FORMING REACTANT PULSES BY OPERATING A VALVE ASSEMBLY

This application claims priority to a European application No. EP 03076812.1 filed Jun. 11, 2003.

FIELD OF THE INVENTION

This invention relates to the field of gas supply systems and valves for the control of process gases in semiconductor processing.

BACKGROUND

In processing apparatuses for the processing of semiconductor substrates, shut-off valves are used for the control and switching of process gases. State of the art valves are diaphragm valves. The diaphragm is formed by a flexible membrane, which is, in a closing position of the valve, pressed against a seat around an opening, and thus closing the opening. In an open position the diaphragm is spaced from the seat allowing the passage of gas. An exemplary valve is described in U.S. Pat. No. 5,131,627 of Kolenc. A problem of shut-off valves is the dead volume: after shut-off of the valve process gas is still present in the dead volume downstream of the valve. This dead volume can be present in the valve device itself and/or in the tubing connected to the valve device. In a shut-off state of the valve, the process gas present in the dead volume can and will undesirably migrate further downstream through the tubing, giving rise to undesirable effects. In U.S. Pat. No. 5,542,452 of Carver, Jr et. al., a valve assembly is disclosed that exhibits zero dead volume. The valve comprises one inlet port and two outlet ports, all opening up at the membrane. In a closed position, the inlet port is closed-off by the membrane which is pressed against the valve seat, but the two outlets are in communication with each other. In an open position, the inlet is in communication with the outlets. After feeding a sample of a fluid across the valve seat from the inlet into the outlets, after closure of the valve the fluid sample can be transported away from the valve by passage of fluid between the two outlet ports, leaving no residues of the fluid sample behind within the valve device or in the tubing connected to the valve. Although dead volume effects are omitted in this way, this valve assembly still has the disadvantage that the quality of the shut-off fully depends on the quality of the seal of the membrane against the valve seat.

In case of Atomic Layer Deposition (ALD) wherein at least two mutually reactive reactants are fed to a reaction chamber in a sequence of alternating and repeating pulses, adequate separation of the different reactants is absolutely required, also after prolonged use of the system, resulting in possible wear. Additional problem is that many reactants used in ALD are at room temperature in liquid or solid state and have a very low vapour pressure. Therefore, the gas feed system needs to be heated, without any cold spots in the system that could result in condensation of the reactant. Consequently, the valve needs to operated at elevated temperature, which can be as high as 300° C. The performance of this type of valves under such conditions is relatively unknown.

It is the object of the present invention to provide a gas supply system that can shut-off a reactant without any dead volume effects and that can be operated to release well-separated pulses of a reactant while allowing a degradation of the seal between the valve member such as e.g. a membrane and the valve seat without deterioration of the separation of the pulses. It is a further objective of the present invention to provide a gas supply system and a valve assembly for low vapour pressure reactants, having no dead volume and capable of delivering repeated, well separated pulses of a reactant at an elevated operating temperature of the valve assembly to avoid condensation of the reactant.

It is a further object of the invention to provide a method for the switching of a reactant by a diaphragm valve that ensures the formation of repeated, well-separated pulses of the reactant, omitting dead-volume effects and allowing a degradation of the seal between the membrane and the valve seat without deterioration of the separation of the pulses.

SUMMARY

A gas supply system is provided, comprising a reactant switch-off valve with four ports, having a first fluid passage between a first and a second port and a second fluid passage between a third and a fourth port. The fluid passages are separable and are in communication with spaces adjacent to and at opposite sides of the valve seat, such that in a closed state of the valve the fluid passages are separated and in an open state of the valve the fluid passages are in communication with each other. The gas supply system further comprises a reactant fluid passage, at one end in communication with the first port of said first fluid passage and at an opposing end in communication with a feed of reactant. A second valve is provided to switch said reactant fluid passage selectively into communication with an exhaust, and said second and third ports are connected to a feed of purge gas and said fourth port is connected to a reactor. In an advantageous embodiment of the gas supply system, the first and second valves and the reactant fluid passage are integrated into a single valve body. According to an aspect of the invention, the valve body is provided with a heater.

According to a further aspect of the invention, a method is provided for switching a process fluid by operating a gas supply system according to the invention, wherein the method comprises flowing an inert gas along both sides of a seal formed between the membrane and the valve seat in a closed position of the valve. The method comprises providing a first valve, being a four-port diaphragm valve having a first fluid passage between a first and a second port and a second fluid passage between a third and a fourth port, the fluid passages being separable and in communication with spaces adjacent to and at opposite sides of the valve seat, such that in a closed state of the valve the fluid passages are separated and in an open state of the valve the two fluid passages are in communication with each other. The method further comprises providing a reactant, and during a reactant flow step maintaining said first valve in an open state and flowing said reactant via the first port through said first fluid passage into said second fluid passage and at the end of the reactant flow step closing said first valve. The method comprises flowing a purge gas through the second fluid passage and along the reactant-downstream-side of the seat of the first valve during a closed state of the first valve. The method includes providing a reactant fluid passage which is at one end in communication with the first port of said first valve and at an opposing end in communication with a feed of reactant and wherein a second valve is provided to switch said reactant fluid passage selectively into communication with an exhaust during a purge step, when said first valve is in a closed state, and during the purge step flowing a purge gas via the second port of the first valve, through said first fluid passage to the first port and through said reactant fluid passage towards the exhaust so that the reactant-upstream-side of the seat of the first valve is being purged.

DETAILED DESCRIPTION OF THE INVENTION

A diaphragm valve assembly comprising one inlet port and two outlet ports, as described by Carver Jr. in U.S. Pat. No. 5,542,452, the ports connected to fluid channels which open up directly adjacent to the membrane are commercially available, e.g. from Qualiflow S.A. in Montpellier, France. Also valves comprising four ports are available from this and other suppliers. Although these four-port valves are available in various configurations, for the present invention we wish to exploit a configuration comprising two separable fluid passages, the first passage connecting a first pair of ports and the second passage connecting a second pair of ports, wherein in a closed position of the valve the fluid passages are separated and in an open state of the valve the two fluid passages are in communication with each other. This known valve will now be used and combined in an inventive way with at least one other valve and with a feed for purge gas to reach the desired effect.

Figure 1:
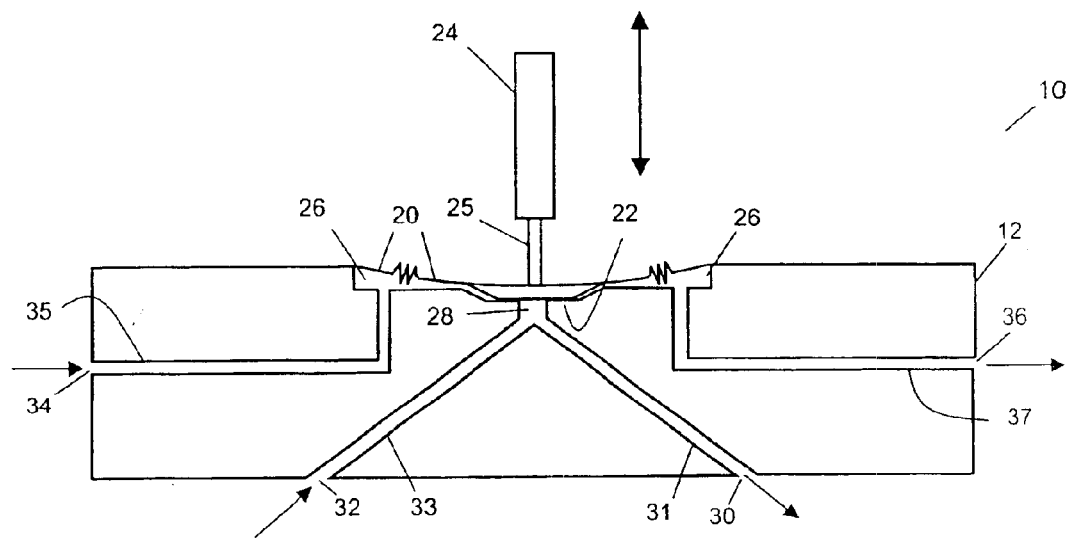
FIG. 1 is a diaphragm valve comprising four ports and two separate gas passages, the valve being in closed position.

The invention will now be described in more detail with reference to the appended figures, in which identical reference numerals indicate identical parts. A four-port valve, comprising two separable gas passages is schematically shown in FIG. 1 in the closed position wherein the gas passages are separated and in FIG. 2 in the open position wherein the two gas passages are in communication with each other. The valve is indicated in its entirety by 10 and the valve body is indicated with 12. In the closed position, membrane 20 is pressed against valve seat 22 by forces exerted by actuator 24 via beam 25. The valve comprises four ports 30, 32, 34 and 36, in communication with fluid channels 31, 33, 35 and 37 respectively, the fluid channels discharging in proximity of the membrane and/or the valve seat. In the closed position, as shown in FIG. 1, ports 30 and 32 are in communication with each other via fluid channels 31 and 33 and a space 28 adjacent to the membrane. Similarly, ports 34 and 36 are in communication with each other via channels 35 and 37 and a space 26 adjacent to the membrane. Spaces 26 and 28 are located at opposite sides of the valve seat 22.

According to the invention, in the closed state of valve 10 ports 32 and 34 are in communication with a source of purging gas. A first flow of purging gas is passing through port 32, fluid channel 33, space 28, fluid channel 31 and port 30. A second flow of purging gas is passing through port 34, fluid channel 35, space 26, fluid channel 37 and port 36. Consequently, both sides of the seal in the valve, formed by membrane 20 pressed against seat 22, are purged by a purging gas and all traces of reactant in the valve and in the fluid channels are expelled from the valve by the purging gas flows.

Figure 2:
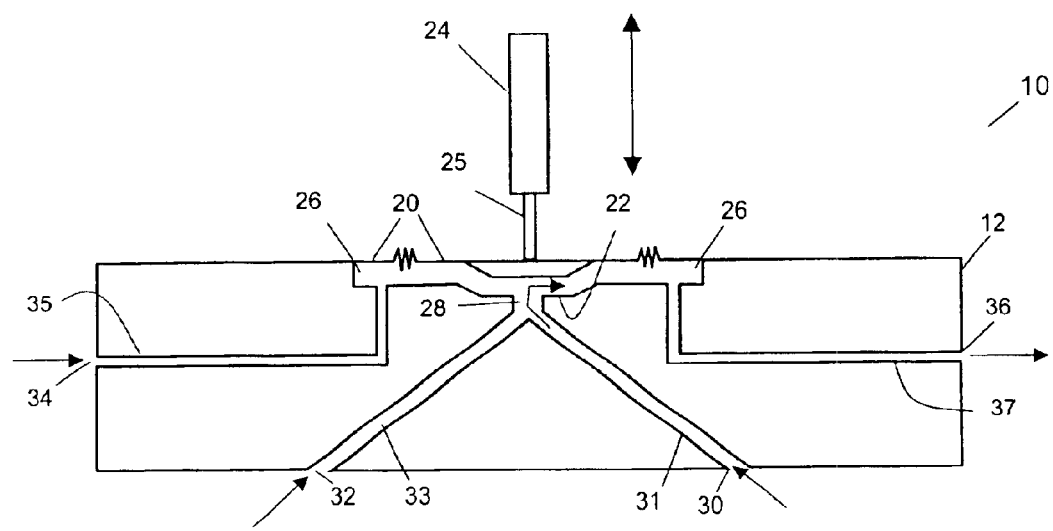
FIG. 2 is a diaphragm valve comprising four ports and two gas passages, the valve being in open position, to allow communication between the gas passages.

In an open position of the valve, as shown in FIG. 2, membrane 20 is moved in a spaced relationship relative to seat 22, leaving free a passage for fluid to flow from space 28 to space 26 or vice versa.

According to a preferred embodiment of the invention, a reactant is now fed to a port that is during purging in a downstream position relative to valve seat 22. Such a port is e.g. port 30. During the reactant flow step, reactant is fed to port 30, flowing through fluid channel 31, space 28, space 26 and fluid channel 37 and leaving the valve body at port 36. Consequently, during a reactant flow step in the valve's open position, reactant is flowing in one direction through fluid channel 31 whereas during the closed position of the valve, purge gas is flowing through fluid channel 31 in an opposite or counter-flow direction. In this way the reactant is not only prevented to flow by the mechanical seal of the valve but also by the diffusion barrier in fluid channel 31, formed by the counter-flow of the purging gas.

To facilitate the reactant flow step, port 30 is connected with a supply of reactant and during the reactant flow step port 30 is in active communication with the supply of reactant. Further, to allow purging of the valve in the valve closed position, port 30 is connected with an exhaust for gas and during the purge step port 30 is in active communication with the exhaust. At least one valve is provided to switch between a first condition wherein port 30 is in active communication with the exhaust and a second condition wherein port 30 is in active communication with the source of reactant and port 30 is not in active communication with the exhaust. Note that within the context of this disclosure we specify that A is "connected" with B it means that a gas flow path such as a conduit between A and B is present but it can comprise a valve that is in a closed state. When we specify that A is "in communication with" or "in active communication with" B, it means that a gas flow path such as a conduit between A and B is present and that it is open, allowing gas to flow from A to B.

Figure 3:
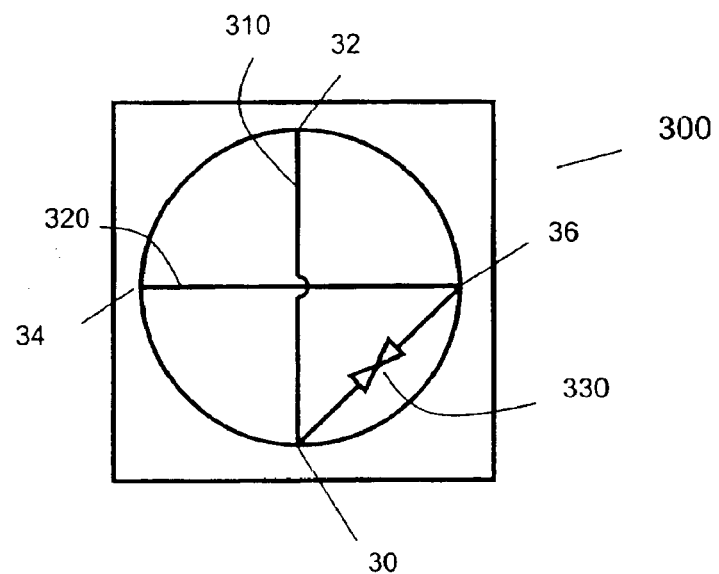
FIG. 3 is a symbolic representation of a valve comprising four ports and two separated gas passages.
Figure 4:
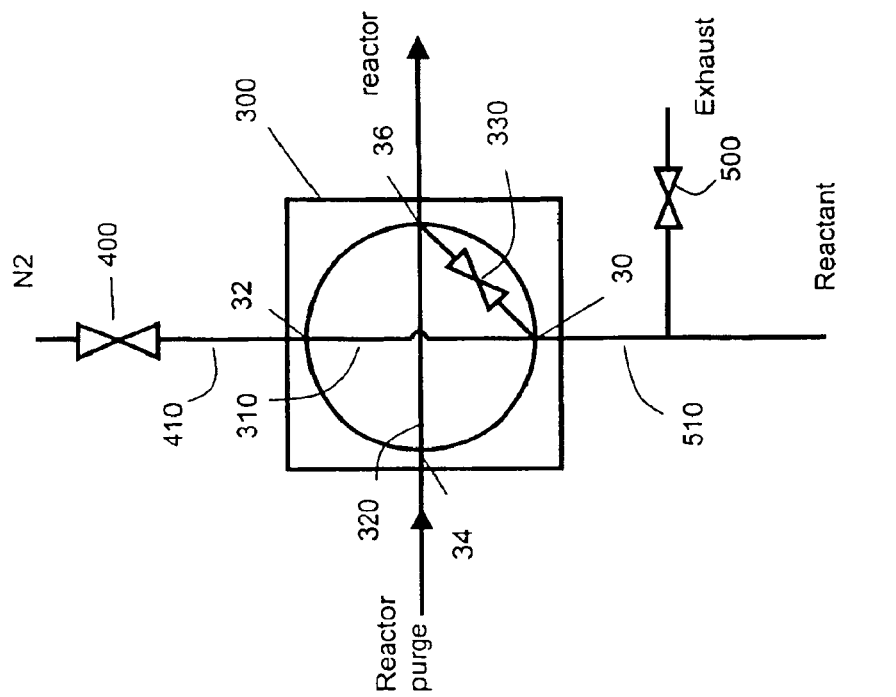
FIG. 4A is a schematic representation of a basic embodiment of the valve assembly of the present invention comprising two valves.
FIG. 4B is a schematic representation of another basic embodiment of the valve assembly of the present invention, comprising three valves.
Figure 4:
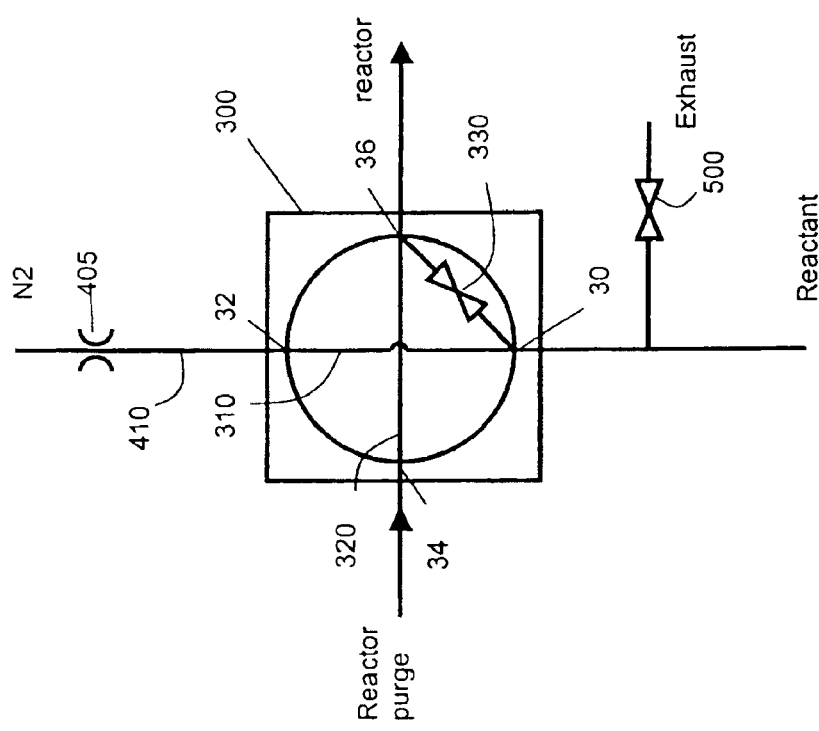

FIG. 3 shows a symbol, representing valve 10 as shown in FIGS. 1 and 2. The valve in its entirety is indicated with reference numeral 300. The vertical line 310 and the horizontal line 320 represent the two separated fluid passages, respectively. Valve 330 represents the switching function of the valve: by opening valve 330, first fluid passage 310 and second fluid passage 320 are brought into communication with each other. In FIG. 4, two basic embodiments of the present invention are shown comprising the four-port valve of FIG. 3.

In FIG. 4A an embodiment comprising a second valve is shown. A reactant fluid passage 510 is provided, at one end connected to port 30 of valve 300 and at an opposing end connected to a feed of reactant (not shown). Second valve 500 can switch reactant fluid passage selectively into communication with an exhaust. Port 32 is connected to a feed of purge gas through a purge gas conduit 410 comprising a flow restrictor 405 to restrict the flow. Port 34 is connected to a feed of reactor purge gas and port 36 is connected to a reactor. During a reactant flow step, valve 330 is open and valve 500 is closed. Reactant is flowing via reactant fluid conduit to port 30 and via open valve 330 to port 36. Purge gas is flowing via purge gas conduit 410 via port 32 and valve 330 to port 36. During a purge step, valve 330 is closed and valve 500 is open and purge gas is flowing through purge gas conduit 410 to port 32, through first fluid passage 310 to port 30 and through reactant fluid conduit and valve 500 to the exhaust. During the purge step, a purge gas is supplied to port 34 and flowing through second fluid passage 320 to port 36. In FIG. 4B a third valve 400 is provided in the purge gas fluid conduit 410 to be able to shut-off the purge gas flow through the first conduit during the reactant flow step to avoid unnecessary dilution of the reactant.

Figure 5:
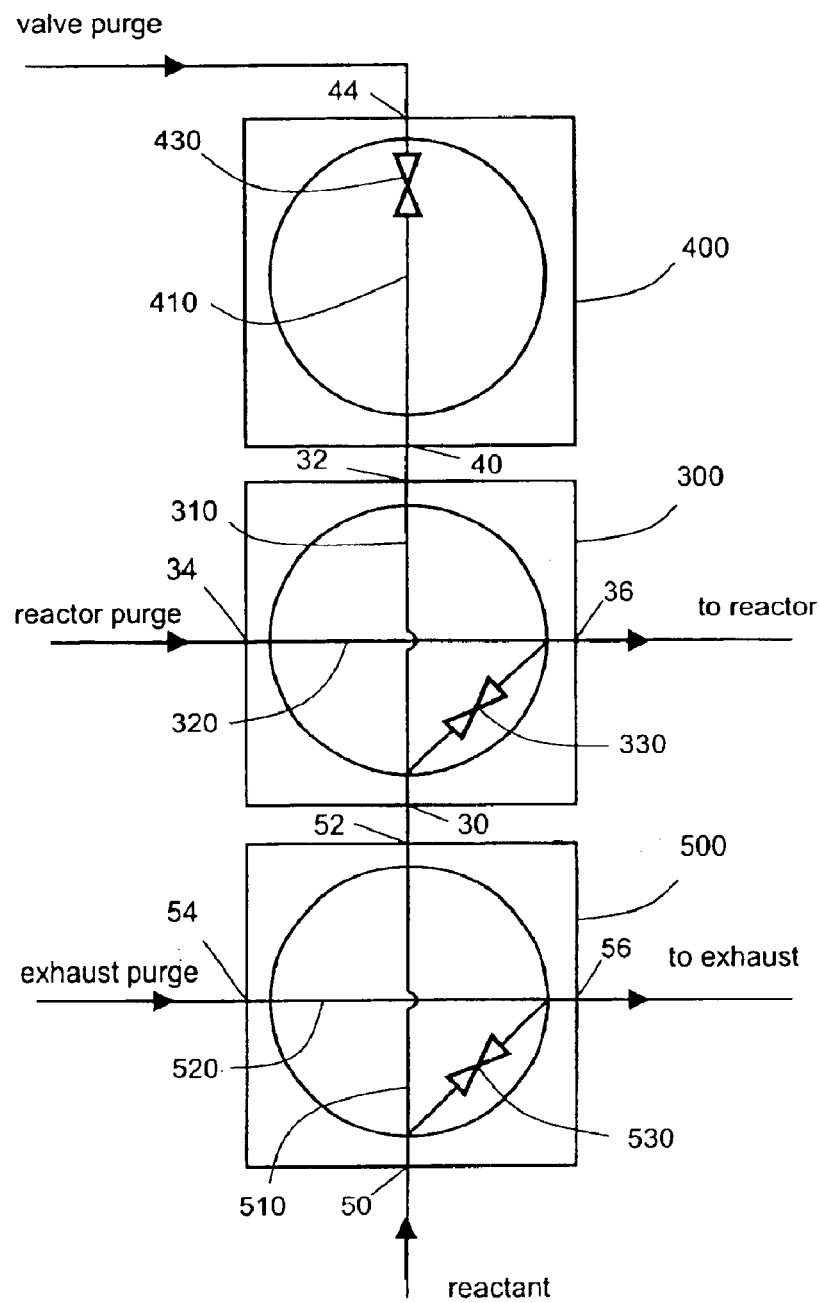
FIG. 5 is a symbolic representation of an embodiment of a valve assembly of the present invention.

A preferred embodiment of the invention comprising three valves is shown in FIG. 5. The second and third valves (400, 500) are now represented in the same manner as the four-port switching valve 300 discussed before and shown in FIG. 3. Port 34 is connected to a reactor purge feed and is in communication with port 36, which is connected to a process reactor. Port 32 is connected to a valve purge feed through valve 400, which includes purge fluid passage 410 and valve function 430. Port 30 is alternatingly in communication with a reactant feed and an exhaust, through valve 500, which includes reactant fluid passage 510 and valve function 530. The exhaust can be maintained at low pressure through the use of a vacuum pump, or the exhaust can be at atmospheric pressure. In a preferred embodiment, valve 500 is also a four-port valve with two separable fluid passages 510 and 520. A first fluid passage 510 between port 50 and port 52 is a reactant fluid passage wherein port 50 is connected to a feed of reactant and port 52 is in communication with port 30 of valve 300. A second fluid passage 520 is provided between port 54 and port 56. Port 54 is connected to an exhaust purge feed and pump 56 is connected to an exhaust. By opening valve 530, the first and second fluid passages of valve 500 are switched into communication with each other. The advantage of four-port valve 500 is that in this way we have also realised a connection for the exhaust purge although this connection can also be made in another way. In general, it can be expected that in every conduit where there is no positive flow of gas and that is at one end in communication with an exhaust, back diffusion of impurities from the exhaust into the conduit will occur. Therefore, a positive gas flow is preferably maintained in such conduits.

It should be noted that although valve 500 is shown as a four-port valve, comprising two pairs of separable fluid passages, which can be switched into communication with each other, the same function can also be performed by two conduits, wherein each conduit is provided with a T-cross and both T-crosses are connected via a third conduit and wherein the third conduit comprises a two-port valve. However, by using above-mentioned four-port valve, all required components are provided in a very compact way, which is convenient.

Figure 6:
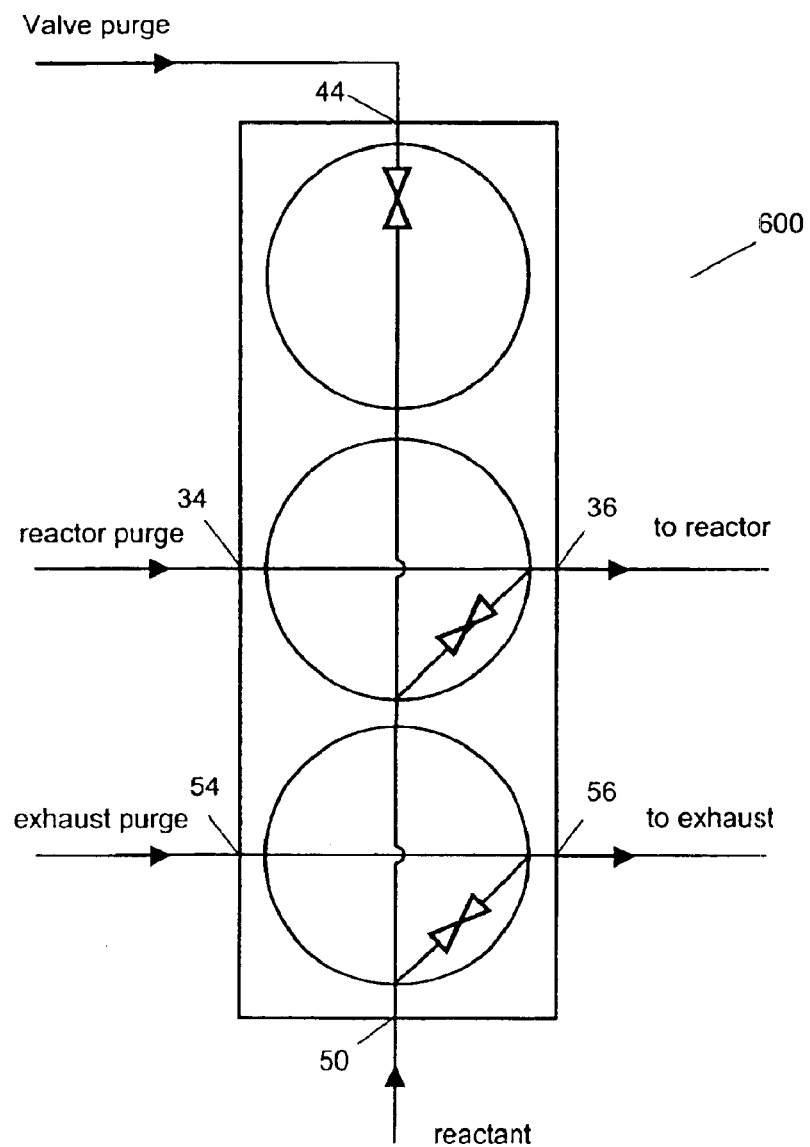
FIG. 6 is a symbolic representation of another embodiment of a valve assembly of the present invention, comprising three valves integrated into a single valve body.

In a more preferred embodiment, the three valves shown in FIG. 5 are integrated into one valve body, as schematically shown in FIG. 6 wherein the valve assembly is indicated in its entirety by 600. This integration simplifies heating of the valve assembly for use with low vapour pressure reactants to avoid condensation of the reactant. Heating to temperatures in a range of 50 to 300° C. can be required. When the valves are integrated into one body, the body can be heated and isolated as a whole. Preferably, in this embodiment all three valves are diaphragm valves.

Figure 7:
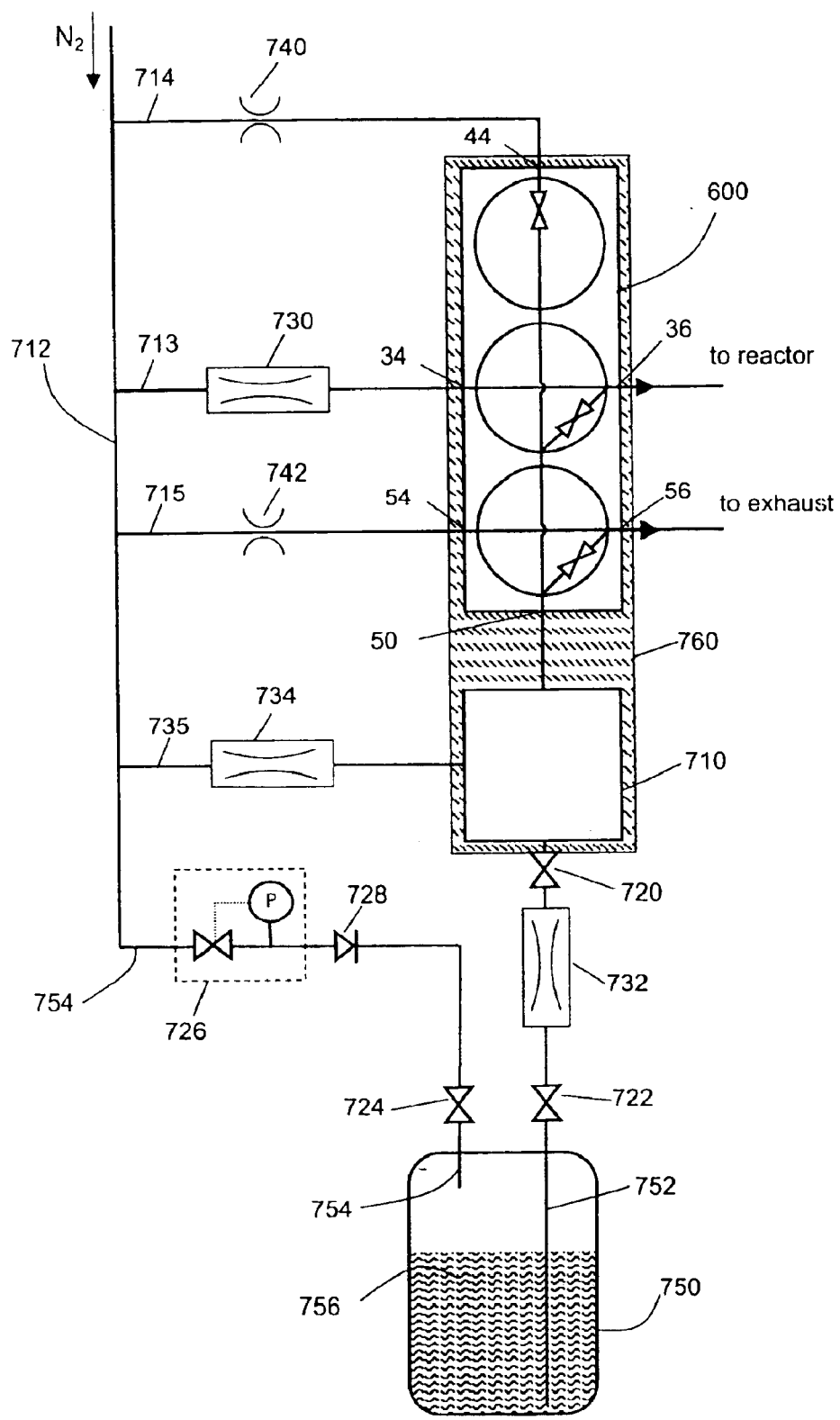
FIG. 7 is an example of a reactant supply system comprising the valve assembly of FIG. 6.

A schematic representation of a reactant supply system according to which the valve assembly of the present invention can be used is shown in FIG. 7. The valve assembly of the present invention is indicated by 600. An evaporation chamber 710 is in communication with valve assembly 600 via reactant inlet port 50. Heated zone 760 encloses valve assembly 600, evaporation chamber 710, and the connection therebetween. Reactant 756 is contained in reactant vessel 750 and is fed to evaporation chamber 710 through reactant feed line 752. Reactant feed conduit 752 comprises reactant flow controller 732 to control the liquid flow of reactant 756 and shut-off valves 720 and 722. The upper region of reactant vessel 750 is pressurised with nitrogen via nitrogen manifold conduit 712 and nitrogen feed conduit 754. Nitrogen feed conduit 754 is provided with a pressure switch 726 and check valve 728. Nitrogen can be fed directly to evaporation chamber 710 via conduit 735, comprising mass flow controller 734. Various ports of the valve assembly 600 are connected to nitrogen manifold conduit 712. Conduit 714, connecting manifold conduit with valve purge port 44 is provided with a flow restrictor 740 to limit the nitrogen flow. Conduit 713, connecting manifold conduit 712 with reactor purge port 34 is provided with a mass flow controller 730 to control the reactor purge flow at a constant value. Conduit 715, connecting manifold conduit 712 with pump purge port 54, is provided with flow restrictor 742. Port 36 of valve assembly 600 is connected to a process reactor and port 56 is connected to an exhaust, which is preferably in communication with a pump.

It will be clear that a complete processing system can comprise more than one reactant supply systems as shown in FIG. 7. Further, the reactant supply system shown in FIG. 7 is just an example and many variations are possible. Instead of $N_2$, also another purging gas can be use such as noble gases like Ar and He or other inactive gases can be used. Further, different purging gases can be used for different purposes, e.g. Ar to pressurise the reactant vessel and $N_2$ for the other purging applications.

Figure 8:
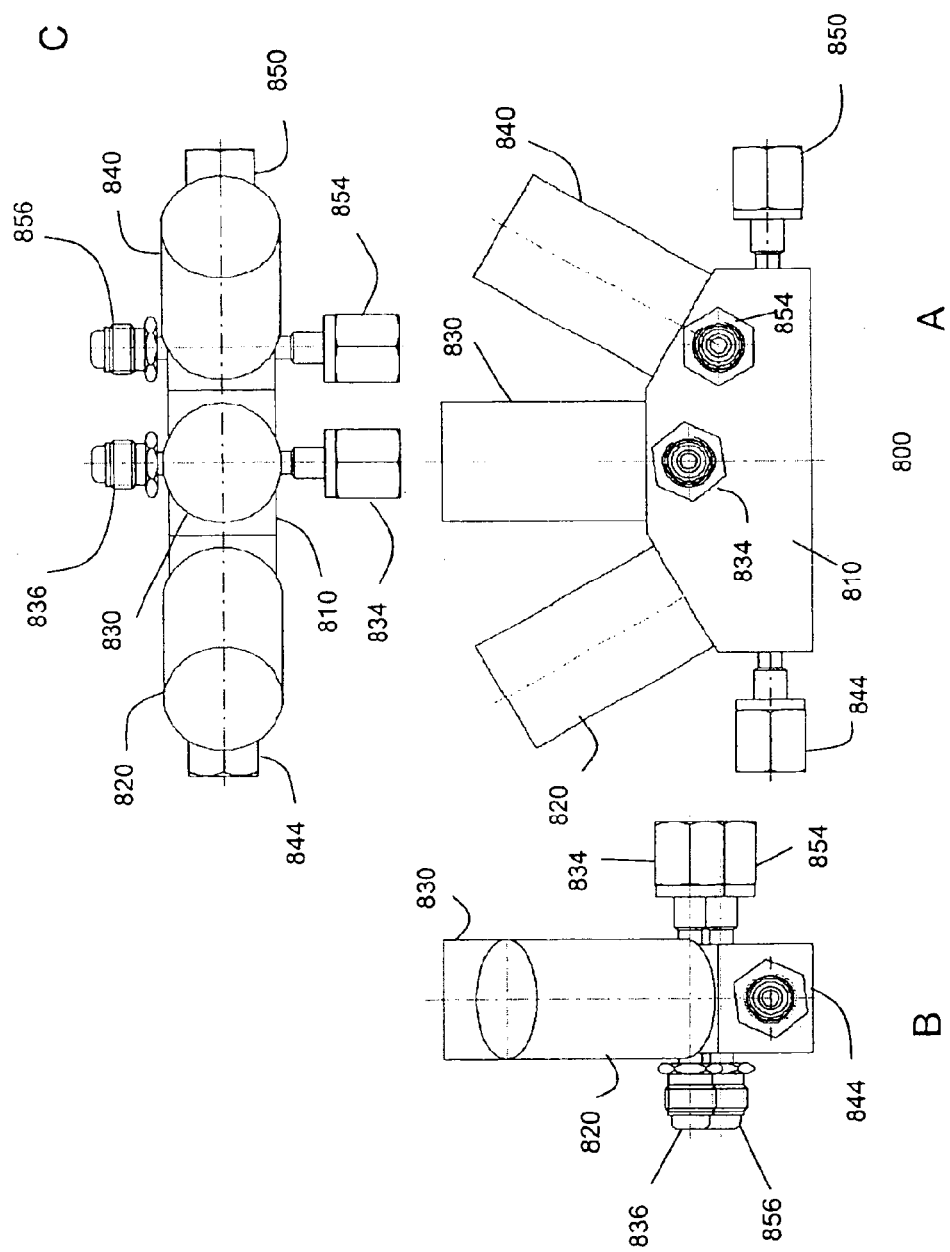
FIG. 8A is an embodiment of a valve assembly of the present invention in side view.
FIG. 8B is the valve assembly of FIG. 8A in front view.
FIG. 8C is the valve assembly of FIG. 8A in top view.

FIG. 8 shows an embodiment of the valve assembly of the present invention. FIG. 8A is a side view, FIG. 8B is a front view and FIG. 8C is a top view. The valve assembly in its entirety is indicated by 800. Valve assembly 800 comprises a single valve body 810 on which are mounted inlet ports 834, 844, 850 and 854, outlet ports 836 and 856 and valve actuators 820, 830 and 840. Similar to the valve assembly, schematically shown in FIG. 6, 834 is the reactor purge inlet port, 844 is the valve purge inlet port, 854 is the exhaust purge inlet port and 850 is the reactant inlet port. Outlet port 836 is connected to a reactor and outlet port 856 is connected to an exhaust. Preferably, valve assembly 800 is provided with a heater, not shown, to heat the valve assembly and to maintain the valve at an elevated temperature in the range of 50 to 300° C. and more preferably in a temperature range of 150 to 250° C. The heater can be integrated within the valve body, by inserting a heater into a hole or recess within the valve body. Alternatively a heater body can be provided, wherein the heater body comprises the heater and wherein the heater body is in intimate contact with the valve body 810 and preferably at least partially encloses valve body 810. Preferably a temperature sensor, to sense the temperature of the valve body or the heater body and a temperature controller are provided so that the temperature of the valve body can be maintained and controlled at a constant value.

Figure 9:
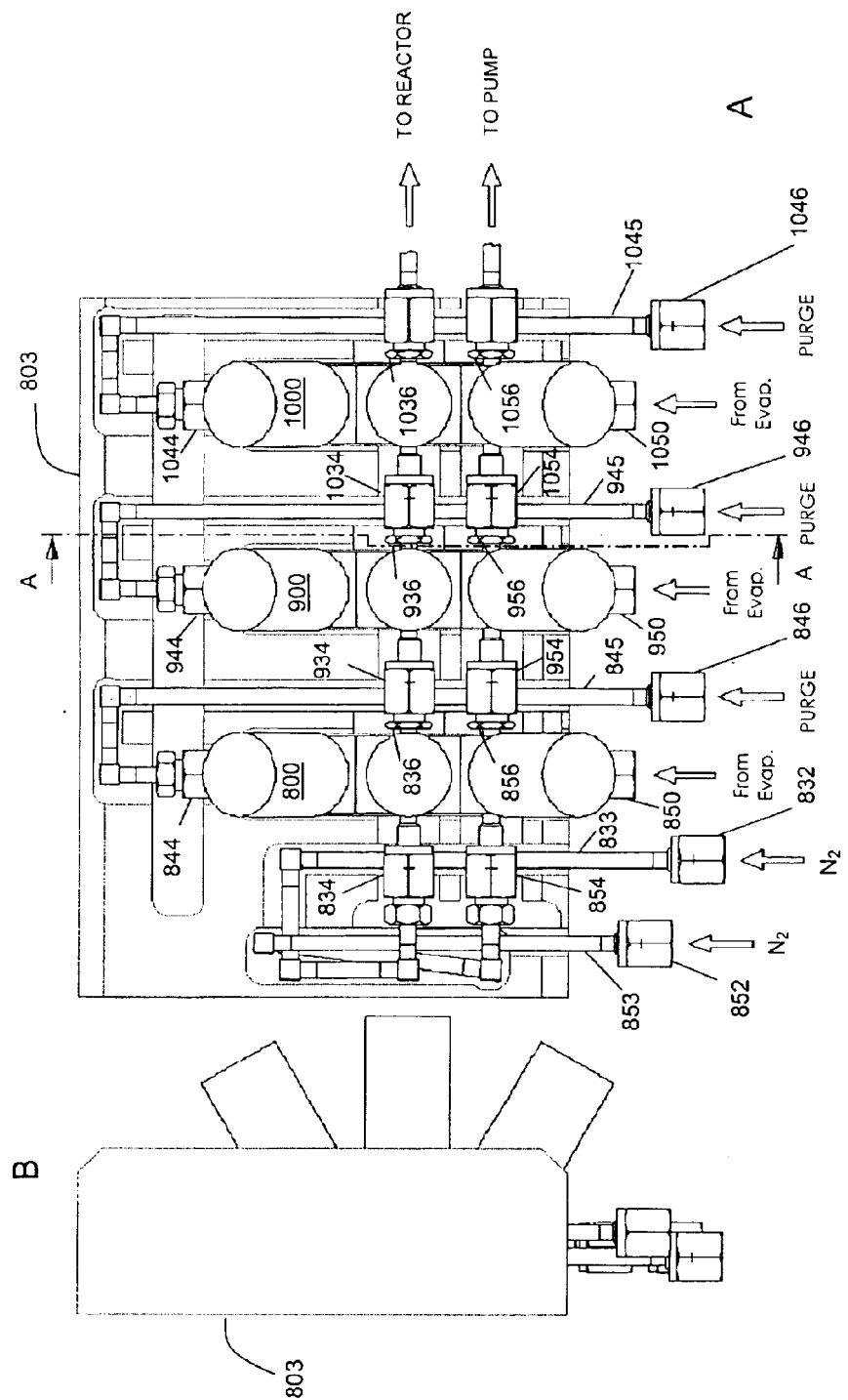
FIG. 9A is a combination of three valve assemblies, mounted side-by-side onto a common heating body, in top view.
FIG. 9B is the combination of FIG. 9A, in side view.

When using an actual process for the deposition of a thin film onto a substrate, such as an ALD process, more than one reactant is required. In FIG. 9 an embodiment of the present invention is shown wherein three identical valve assemblies 800, 900 and 1000 of the present invention are connected and mounted side-by-side. FIG. 9A is a top view and FIG. 9B is a side view. For valve assembly 800, identical parts are indicated with identical reference numerals as in FIG. 8. For valve assemblies 800, 900 and 1000, similar parts are indicated with reference numerals having identical last two digits (e.g. 850, 950 and 1050 for the reactant inlet ports of assemblies 800, 900 and 1000, respectively). Outlet port 836 of valve assembly 800 is connected to reactor purge inlet port 956 of valve assembly 900. Outlet port 856 of valve assembly is connected to exhaust purge inlet port 954 of valve assembly 900. Valve assembly 1000 is connected to valve assembly 900 in the same way as valve assembly 900 is connected to valve assembly 800.

Preferably, the connected valve assemblies are provided with heaters to heat the valve assemblies and more preferably, the side by side connected valve assemblies are provided with a single heater that extends over the constituting valve assemblies and preferably at least partially encloses said valve assemblies. In FIG. 9 a heater body 803 is shown onto which the valve assemblies are mounted. Heater body 803 is a plate of material with high thermal conductivity, such as aluminium. More preferably, heater body 803 is a block or assembly of highly conductive material, such as aluminium, into which a number of recesses are provided that accommodate said valve assemblies and their connections, including the conduits connected to the various inlet ports of the connected valve assemblies. This avoids cold spots at the connection points and/or simplifies the heating and thermal isolation of the side-by-side connected valve assemblies and their connections.

Valve purge inlet ports 844, 944 and 1044 are connected through conduits 845, 945 and 1045 with external valve purge inlet ports 846, 946 and 1046, respectively. Reactor purge inlet port 834 is connected through conduit 833 with external reactor purge inlet port 832. Finally, exhaust purge inlet port 854 is connected through conduit 853 to external exhaust purge inlet port 852. When flowing through conduits 845, 945, 1045, 833 and 853, the N2 or purge gas can heat-up and assume the temperature of the heater body before it enters one of the valve assemblies. Therefore, conduits 845, 945, 1045, 833 and 853 extend over a significant length of the heating body 803. Preferably this length is 10 times the diameter of the conduit and more preferably this length is 20 times the diameter of the conduit. This allows adequate pre-heating of the N2 and the purge gas before feeding it into one of the inlet ports of one of the valve assemblies.

Figure 10:
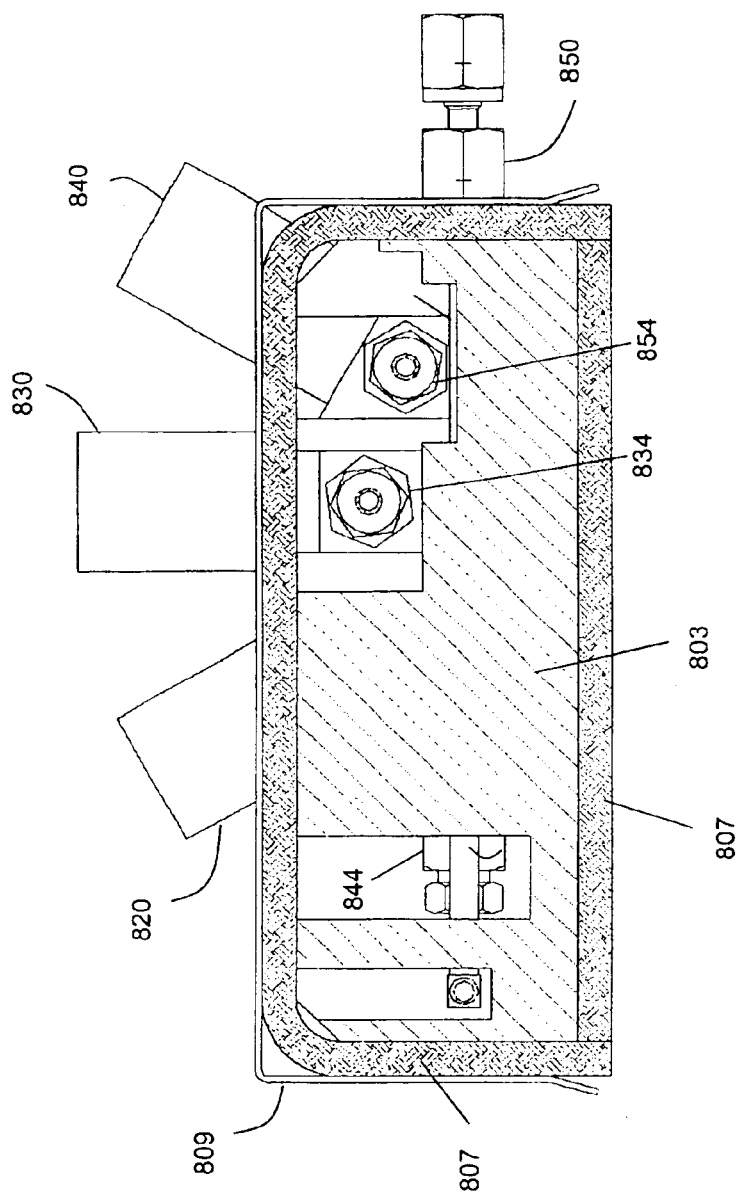
FIG. 10 is a cross-sectional view of the combination of FIG. 9A along line A—A.

A cross-section of the connected valve assemblies of FIG. 9 along line A—A is shown in FIG. 10. Identical parts are provided with identical reference numerals as in FIG. 9. In FIG. 10 also isolation material 807 and cover 809 are shown.

The isolation material provides in adequate thermal isolation of the connected valve assemblies and provides in mechanical protection of the isolation material. Heater body 803 is preferably a block of aluminium, machined to provide recesses wherein the valve assemblies, their connections and the necessary conduits can be accommodated. In this way, the valve assemblies are not only heated from the bottom but also from the sides by upwardly extending parts of the heater body. The heater body is provided with one or more heaters, not shown. These one or more heaters can be mounted in recesses or holes in heater body 803. Preferably, heater body 803 is also provided with a temperature sensor to sense the temperature. The heaters and temperature sensor are preferably connected with a controller to control the temperature of the valve assemblies at a constant value.

Figure 11:
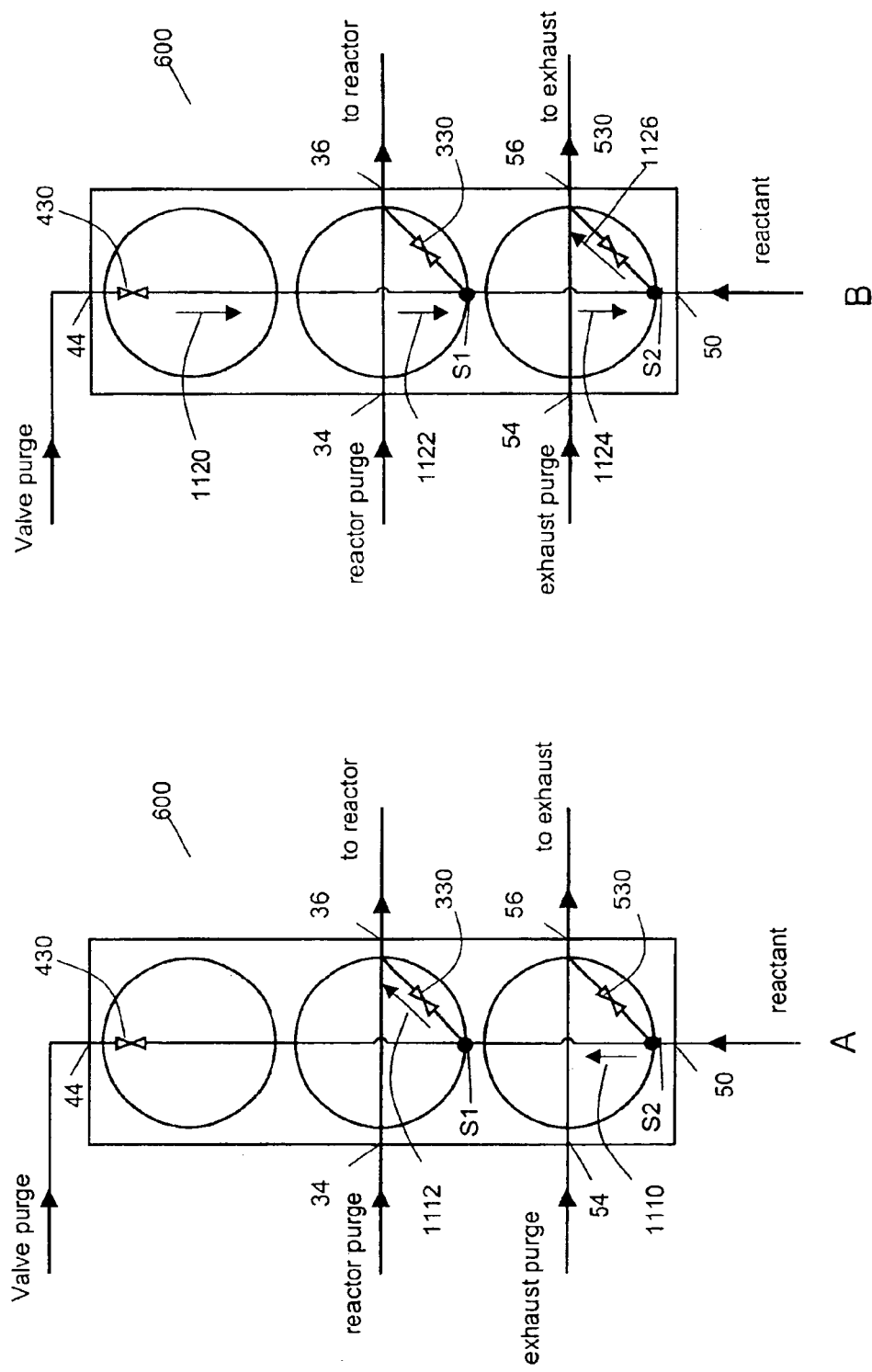
FIG. 11A is the schematic representation of the valve assembly of FIG. 6, in a reactant flow state.
FIG. 11B is the valve assembly of FIG. 11A in a purge state.

The method according to the invention will now be described with reference to FIGS. 11A and 11B. FIG. 11A is the schematic representation of the valve assembly of FIG. 6, in a reactant flow state and FIG. 11B is the valve assembly in a purge state. In FIGS. 11A and B, identical parts are indicated with identical reference numerals as in FIG. 6. In the reactant flow state, valve 330 is open and valve 530 is closed. As shown in FIG. 11A, reactant is supplied to reactant inlet port 50 and the reactant is flowing through the reactant fluid passage between S2 and S1 as indicated by arrow 1110. The reactant flow passes valve 330, as indicated by arrow 1112 and leaves the valve assembly at port 36. Preferably, during the reactant flow step, a reactor purge gas is flowing from port 34 to port 36 and an exhaust purge gas is flowing from port 54 to port 56. Preferably, during the reactant flow step valve 430 is closed so that no valve purge gas is flowing. However, during the reactant flow step the application of the purge gas flows or their absence is not essential for the present invention.

During a purge step, after completion of the reactant flow step, valve 330 is closed and valve 530 and 430 are opened. A valve purge gas is flowing from valve purge inlet port 44 towards point S1 as indicated by the arrows 1120, 1122. At point S1, valve purge gas flow passes valve 330 at the reactant-upstream-side of the valve seat. Then the valve purge gas flows from S1 to S2 as indicated by arrow 1124. Finally, the valve purge gas passes valve 530 and leaves the valve assembly via port 56. Simultaneous with the valve purge gas flow, a reactor purge gas is supplied to port 34 and flows to port 36. The reactor purge gas passes the valve 330 at the reactant-downstream-side of the seat. In this way, during the valve purge step, the seat of valve 330 is purged at both sides. Preferably, during the valve purge step an exhaust purge gas is supplied at port 54 and flowing from port 54 to port 56.

During the reactant flow step, the reactant is flowing from S2 to S1 whereas during the valve purge step, valve purge gas is flowing in an opposite direction from S1 to S2. This provides, in addition to the mechanical seal of valve 330, an additional purge gas diffusion barrier, safeguarding that during a valve purge step no reactant gas can flow from the reactant inlet port 50 to the reactor.

It will be understood that several options can be chosen, as long as the essential feature of the present invention is reached and that is that during a valve purge step, a purge gas is flowing along both sides of the seat of a diaphragm valve. It is possible to switch off the supply of reactant to reactant inlet port 50 during the valve purge step. However, in many cases it will be convenient to supply a continuous flow of reactant to reactant inlet port 50 and direct during the purge step the reactant through valve 530 towards the exhaust and during a reactant flow step direct the reactant through valve 330 towards the reactor. Further, the valve purge can be switched-off during the reactant flow step or a continuous valve purge can be supplied, both during the reactant flow step and the valve purge step. Preferably, the reactor purge flow and the exhaust purge flow are maintained at a constant value during all steps.

What is claimed is:

1. A gas supply system for pulse-wise feeding a reactant gas to a reactor, the gas supply system comprising:
    a first valve being a four-port diaphragm valve having a first fluid passage between a first and a second port and a second fluid passage between a third and a fourth port, the fluid passages being separable and in communication with spaces adjacent to and at opposite sides of a valve seat, such that in a closed state of the first valve the fluid passages are separated and in an open state of the first valve said fluid passages are in communication with each other;
    a feed of reactant being connected to the first port;
    a feed of purge gas being connected to the second port;
    a feed of purge gas being connected to the third port;
    the fourth port being arranged for connection to said reactor; and
    a second valve which in an open state brings the first port into fluid communication with an exhaust and in a closed state closes off said fluid communication;
    wherein the gas supply system provides a reactant flow state in which the first valve is in an open state and the second valve is in a closed state so that reactant gas flows from the feed of reactant, via the first port and the fourth port to the reactor, and
    wherein the gas supply system provides a purge state in which the first valve is closed and the second valve is in a open state, so that purge gas flows from the second port via the first port to the exhaust and that purge gas flows from the third port via the fourth port to the reactor.

2. The gas supply system of claim 1 wherein the second valve is a four-port valve comprising two separable fluid passages, one passage being the reactant fluid passage and the other passage being an exhaust purge passage, at one end in communication with a feed for purge gas and at an opposing end in communication with said exhaust.

3. The gas supply system of claim 1 wherein further is provided:
    a purge fluid passage for said connection between the purge feed and the second port;
    a third valve in said purge fluid passage to selectively switch said purge fluid passage open and closed.

4. The gas supply system of claim 1 comprising a valve assembly having a single valve body in which said valves and a reactant fluid passage for connecting the reactant feed with the first port are integrated.

5. The gas supply system of claim 3 comprising a valve assembly having a single valve body in which said valves, a reactant fluid passage for connecting the reactant feed with the first port and said purge fluid passage are integrated.

6. The gas supply system of claim 4 wherein the valve body is provided with a heater.

7. A gas supply system according to claim 4 comprising a valve assembly having plurality of said valve bodies wherein the valve bodies are mounted side-by-side, in the same orientation, such that the second fluid passages of said plurality of the valve bodies are directly connected to each other.

8. The gas supply system of claim 7 wherein the second valve is a four-port valve comprising two separable fluid passages, one passage being the reactant fluid passage and the other passage being an exhaust purge passage, and wherein in each valve body extends one said exhaust purge passage, the respective exhaust purge passages of said plurality of valve bodies being directly connected to each other.

9. The gas supply system according to claim 8, comprising a heater to heat said valve assembly.

10. The gas supply system of claim 9 further comprising a common thermal isolation mantle, substantially enclosing said valve assembly.

11. A valve assembly suitable for use in a gas supply system according to claim 4.

12. Method of switching a process fluid by operating a gas supply system according to claim 1, the method comprising:
    providing the first valve, being a four-port diaphragm valve having a first fluid passage between a first and a second port and a second fluid passage between a third and a fourth port, the fluid passages being separable and in communication with spaces adjacent to and at opposite sides of a valve seat, such that in a closed state of the first valve the fluid passages are separated and in an open state of the first valve said fluid passages are in communication with each other;
    providing a reactant;
    during a reactant flow step maintaining said first valve in an open state and flowing said reactant via the first port through said first fluid passage into said second fluid passage;
    at the end of the reactant flow step closing said first valve;
    during a closed state of the first valve flowing a purge gas through the second fluid passage and along a reactant-downstream-side of the valve seat of the first valve;
    providing a reactant fluid passage which is at one end in communication with the first port of said first fluid passage and at an opposing end in communication with a feed of reactant;
    providing a second valve which in an open state brings the first port into fluid communication with an exhaust and in a closed state closes off said fluid communication;
    during an open state of the first valve keeping the second valve in a closed state;
    during a closed state of the first valve keeping the second valve in an open state and flowing a purge gas via the second port through the first fluid passage to the first port and through at least part of the reactant fluid passage towards the exhaust, so that a purge gas is flowing along a reactant-upstream-side of the valve seat of the first valve.

13. The method of claim 12 further comprising:
    providing a purge fluid passage in communication with said second port;
    providing a third valve in said purge fluid passage to selectively switch said purge fluid passage open and closed;
    in a closed state of said first valve keeping said third valve in an open state and flowing purge gas through said purge fluid passage and through said first fluid passage via said second port; and
    in an open state of said first valve keeping said third valve in a closed state.

14. The method of claim 13 further comprising providing a single valve body wherein said valves, said reactant fluid passage and said purge fluid passage are integrated.

15. The method of claim 14, wherein providing a reactant comprises providing a low vapour pressure reactant, and the method includes heating the single valve body.

16. The method of claim 12 wherein pulses of the reactant and a second reactant are alternatingly fed to the reactor.

17. The gas supply system of claim 2 wherein further is provided:
a purge fluid passage for said connection between the purge feed and the second port;
a third valve in said purge fluid passage to selectively switch said purge fluid passage open and closed.

18. The gas supply system of claim 2 comprising a valve assembly having a single valve body in which said valves and a reactant fluid passage for connecting the reactant feed with the first port are integrated.

19. The gas supply system of claim 18 said single valve body and said purge fluid passage are integrated.

20. The gas supply system of claim 19 wherein the valve body is provided with a heater.

21. A gas supply system according to claim 19 comprising a valve assembly having plurality of said valve bodies wherein the valve bodies are mounted side-by-side, in the same orientation, such that the second fluid passages of said plurality of the valve bodies are directly connected to each other.

22. The gas supply system of claim 21 wherein in each valve body extends one said exhaust purge passage, the respective exhaust purge passages of said plurality of valve bodies being directly connected to each other.

23. The gas supply system according to claim 22, comprising
a heater to heat said valve assembly; and
a common thermal isolation mantle, substantially enclosing said valve assembly.

24. Method of switching a process fluid by operating a gas supply system according to claim 20, the method comprising:
providing said first valve, being a four-port diaphragm valve having a first fluid passage between a first and a second port and a second fluid passage between a third and a fourth port, the fluid passages being separable and in communication with spaces adjacent to and at opposite sides of the valve seat, such that in a closed state of the first valve the fluid passages are separated and in an open state of the first valve the two fluid passages are in communication with each other;
providing a reactant;
during a reactant flow step maintaining said first valve in an open state and flowing said reactant via the first port through said first fluid passage into said second fluid passage;
at the end of the reactant flow step closing said first valve;
during a closed state of the first valve flowing a purge gas through the second fluid passage and along a reactant-downstream-side of the valve seat of the first valve;
providing a reactant fluid passage which is at one end in communication with the first port of said first fluid passage and at an opposing end in communication with a feed of reactant;
providing a second valve which in an open state brings the first port into fluid communication with an exhaust and in a closed state closes off said fluid communication;
during an open state of the first valve keeping the second valve in a closed state;
during a closed state of the first valve keeping the second valve in an open state and flowing a purge gas via the second port through the first fluid passage to the first port and through at least part of the reactant fluid passage towards the exhaust, so that a purge gas is flowing along a reactant-upstream-side of the valve seat of the first valve.

25. Method of switching a process fluid by operating a gas supply system according to claim 23, the method comprising:
providing said first valve, being a four-port diaphragm valve having a first fluid passage between a first and a second port and a second fluid passage between a third and a fourth port, the fluid passages being separable and in communication with spaces adjacent to and at opposite sides of the valve seat, such that in a closed state of the first valve the fluid passages are separated and in an open state of the first valve said fluid passages are in communication with each other;
providing a reactant;
during a reactant flow step maintaining said first valve in an open state and flowing said reactant via the first port through said first fluid passage into said second fluid passage;
at the end of the reactant flow step closing said first valve;
during a closed state of the first valve flowing a purge gas through the second fluid passage and along a reactant-downstream-side of the valve seat of the first valve;
providing a reactant fluid passage which is at one end in communication with the first port of said first fluid passage and at an opposing end in communication with a feed of reactant;
providing a second valve which in an open state brings the first port into fluid communication with an exhaust and in a closed state closes off said fluid communication;
during an open state of the first valve keeping the second valve in a closed state;
during a closed state of the first valve keeping the second valve in an open state and flowing a purge gas via the second port through the first fluid passage to the first port and through at least part of the reactant fluid passage towards the exhaust, so that a purge gas is flowing along a reactant-upstream-side of the valve seat of the first valve.

26. The method of claim 24 further comprising:
providing a purge fluid passage in communication with said second port;
providing a third valve in said purge fluid passage to selectively switch said purge fluid passage open and closed;
in a closed state of said first valve keeping said third valve in an open state and flowing purge gas through said purge fluid passage and through said first fluid passage via said second port;
in an open state of said first valve keeping said third valve in a closed state;
providing a single valve body wherein said valves, said reactant fluid passage and said purge fluid passage are integrated; and
wherein providing a reactant comprises providing a low vapour pressure reactant, and the method includes heating the single valve body.

27. The method of claim 25 further comprising:
providing a purge fluid passage in communication with said second port;
providing a third valve in said purge fluid passage to selectively switch said purge fluid passage open and closed;

in a closed state of said first valve keeping said third valve in an open state and flowing purge gas through said purge fluid passage and through said first fluid passage via said second port;

in an open state of said first valve keeping said third valve in a closed state;

providing a single valve body wherein said valves, said reactant fluid passage and said purge fluid passage are integrated; and wherein providing a reactant comprises providing a low vapour pressure reactant, and the method includes heating the single valve body.

28. The method of claim 24 wherein pulses of the reactant and a second reactant are alternatingly fed to the reactor.

29. The method of claim 25 wherein pulses of the reactant and a second reactant are alternatingly fed to the reactor.

* * * * *